United States Patent
Sugimoto

(10) Patent No.: US 10,068,481 B2
(45) Date of Patent: Sep. 4, 2018

(54) VEHICLE-MOUNTED PERIPHERAL OBJECT NOTIFICATION SYSTEM, OBJECT NOTIFICATION SYSTEM, AND NOTIFICATION CONTROL APPARATUS

(71) Applicant: DENSO CORPORATION, Kariya, Aichi-pref. (JP)

(72) Inventor: Hiroki Sugimoto, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/520,215

(22) PCT Filed: Oct. 19, 2015

(86) PCT No.: PCT/JP2015/005256
§ 371 (c)(1),
(2) Date: Apr. 19, 2017

(87) PCT Pub. No.: WO2016/072053
PCT Pub. Date: May 12, 2016

(65) Prior Publication Data
US 2017/0316695 A1    Nov. 2, 2017

(30) Foreign Application Priority Data
Nov. 5, 2014   (JP) ................................. 2014-225551

(51) Int. Cl.
G06F 17/00    (2006.01)
G06G 7/78    (2006.01)
(Continued)

(52) U.S. Cl.
CPC ............. *G08G 1/166* (2013.01); *B60Q 9/008* (2013.01); *G08G 1/164* (2013.01); *G06T 2207/30252* (2013.01)

(58) Field of Classification Search
CPC ........ G08G 1/166; G08G 1/164; B60Q 9/008; B60R 1/00
(Continued)

(56) References Cited

U.S. PATENT DOCUMENTS

2014/0012464 A1* 1/2014 Hiei .......................... B60R 1/00
701/36

FOREIGN PATENT DOCUMENTS

JP    2001357498 A  * 12/2001
JP    2003118523 A    4/2003
(Continued)

OTHER PUBLICATIONS

English Translation of JP2001-357498A.*
English Translation of JP2007-249757A.*

*Primary Examiner* — Mahmoud S Ismail
(74) *Attorney, Agent, or Firm* — Harness, Dickey & Pierce, P.L.C.

(57) ABSTRACT

A vehicle-mounted peripheral object notification system includes a peripheral object detection device detecting an object existing in a periphery of a vehicle, a notification device notifying a driver of an existence of the object detected by the peripheral object detection device, a visual line detector successively detecting a visual line of the driver of the vehicle, and a notification controller setting, as a notification range, a range obtained by excluding a recognition direction range, which is determined based on the visual line detected by the visual line detector, from a reference notification range, which is determined based on an object detection range of the peripheral object detection device. The notification controller controls the notification device to notify the object when the object detected by the peripheral object detection device exists in the notification range.

8 Claims, 7 Drawing Sheets

(51) Int. Cl.
*G08G 1/16* (2006.01)
*B60Q 9/00* (2006.01)

(58) Field of Classification Search
USPC .................................................. 701/301, 36
See application file for complete search history.

(56) References Cited

FOREIGN PATENT DOCUMENTS

| | | | |
|---|---|---|---|
| JP | 2007249757 A | * | 9/2007 |
| JP | 2007286898 A | | 11/2007 |
| JP | 2012022646 A | | 2/2012 |

* cited by examiner

VEHICLE-MOUNTED PERIPHERAL OBJECT NOTIFICATION SYSTEM, OBJECT NOTIFICATION SYSTEM, AND NOTIFICATION CONTROL APPARATUS

CROSS REFERENCE TO RELATED APPLICATIONS

This application is a U.S. National Phase Application under 35 U.S.C. 371 of International Application No. PCT/JP2015/005256 filed on Oct. 19, 2015 and published in Japanese as WO 2016/072053 A1 on May 12, 2016. This application is based on and claims the benefit of priority from Japanese Patent Application No. 2014-225551 filed on Nov. 5, 2014. The entire disclosures of all of the above applications are incorporated herein by reference.

TECHNICAL FIELD

The present disclosure relates to a vehicle-mounted peripheral object notification system, an object notification system, and a notification control apparatus, each of which is equipped to a vehicle and notifies an existence of an object in a vicinity of the vehicle.

BACKGROUND ART

A device that detects an object existing in the vicinity of a vehicle and notifies a driver of the vehicle of the existence of the object has been known. For example, in Patent Literature 1, a millimeter wave radar detects an object existing in a lane in which a subject vehicle is travelling, a right lane or a left lane relative to the travelling lane. When the detected object is located within a notification target area, the millimeter wave radar notifies the presence of the object.

PRIOR ART LITERATURE

Patent Literature

Patent Literature 1: JP 2003-118523 A

SUMMARY OF INVENTION

In the above configuration, when the existence of all of the objects detected in the notification target area is notified to the driver, the notification may bother the driver.

In view of the foregoing difficulties, it is an object of the present disclosure to provide a vehicle-mounted peripheral object notification system, an object notification system, and a notification control apparatus, each of which is capable of reducing troublesomeness given to a driver.

According to a first aspect of the present disclosure, a vehicle-mounted peripheral object notification system includes a peripheral object detection device, a notification device, a visual line detection unit, and a notification control unit. The peripheral object detection device detects an object existing in a periphery of a vehicle. The notification device notifies a driver of an existence of the object detected by the peripheral object detection device. The visual line detection unit successively detects a visual line of the driver of the vehicle. The notification control unit sets, as a notification range, a range obtained by excluding a recognition direction range, which is determined based on the visual line detected by the visual line detection unit, from a reference notification range, which is determined based on an object detection range of the peripheral object detection device. The notification control unit controls the notification device to notify the object when the object detected by the peripheral object detection device exists in the notification range.

According to a second aspect of the present disclosure, a notification control apparatus includes a visual line detection unit and a notification control unit. The notification control apparatus is employed in a vehicle-mounted peripheral object notification system. The vehicle-mounted peripheral object notification system includes a peripheral object detection device that detects an object existing in a periphery of a vehicle, and a notification device that notifies a driver of an existence of the object detected by the peripheral object detection device. The visual line detection unit successively detects a visual line of the driver of the vehicle. The notification control unit sets, as a notification range, a range obtained by excluding a recognition direction range, which is determined based on the visual line detected by the visual line detection unit, from a reference notification range, which is determined based on an object detection range of the peripheral object detection device. The notification control unit controls the notification device to notify the object when the object detected by the peripheral object detection device exists in the notification range.

According to the above vehicle-mounted peripheral object notification system and the above notification control apparatus, the notification control unit sets the notification range by excluding the recognition direction range determined based on the visual line detected by the visual line detection unit. Thus, the existence of the object recognized in the visual line direction of the driver can be prevented from being notified. Therefore, the existence of the object already recognized by the driver can be suppressed from being notified to the driver, and troublesomeness caused by the notification about the recognized object can be reduced.

According to a third aspect of the present disclosure, an object notification system includes the above vehicle-mounted peripheral object notification system equipped to a first vehicle as a first vehicle-mounted peripheral object notification system and the above vehicle-mounted peripheral object notification system equipped to a second vehicle as a second vehicle-mounted peripheral object notification system. The second vehicle-mounted peripheral object notification system further includes a vehicle-to-vehicle communication device performing a transceiving of a signal in a wireless manner with a different vehicle, a position detection device detecting a current position, an azimuth acquisition unit acquiring a travelling azimuth of the second vehicle, and a transmission control unit controlling the vehicle-to-vehicle communication device to transmit the current position detected by the position detection device, the travelling azimuth acquired by the azimuth acquisition unit, and one of the visual line detected by the visual line detection unit or recognition direction information. The recognition direction information indicates the recognition direction range of the driver of the second vehicle and is determined based on the current position, the travelling azimuth, and the visual line. The first vehicle-mounted peripheral object notification system further includes the vehicle-to-vehicle communication device, the position detection device, and a subject vehicle recognition state determination unit determining whether the driver of the second vehicle recognizes the first vehicle based on the recognition direction range of the driver of the second vehicle and the current position of the first vehicle which is detected by the position detection device when the vehicle-to-vehicle communication device receives the recognition direction information. The recognition direction range of the driver of the second vehicle is determined based on the recognition direction information that is received. The notification control unit determines whether to control the notification device to notify an existence of the second vehicle based on a determination result indicating whether the second vehicle is present in the recognition direction range and a determination result indicating whether the driver of the second vehicle recognizes the first vehicle, and the determination result indicating whether the driver of the second vehicle recognizes the first vehicle is obtained by the subject-vehicle recognition state determination unit.

According to the above object notification system, the first vehicle-mounted peripheral object notification system includes, as a condition for determining whether to notify the existence of the second vehicle, whether the driver of the second vehicle recognizes the first vehicle, in addition to whether the second vehicle is present in the recognition direction range. Therefore, even when the second vehicle is present in the recognition direction range, if the driver of the second vehicle fails to recognize the first vehicle, the existence of the second vehicle can be notified by the notification device.

BRIEF DESCRIPTION OF DRAWINGS

The above and other objects, features and advantages of the present invention will become more apparent from the following detailed description made with reference to the accompanying drawings. In the drawings.

EMBODIMENTS FOR CARRYING OUT INVENTION

Figure 1:
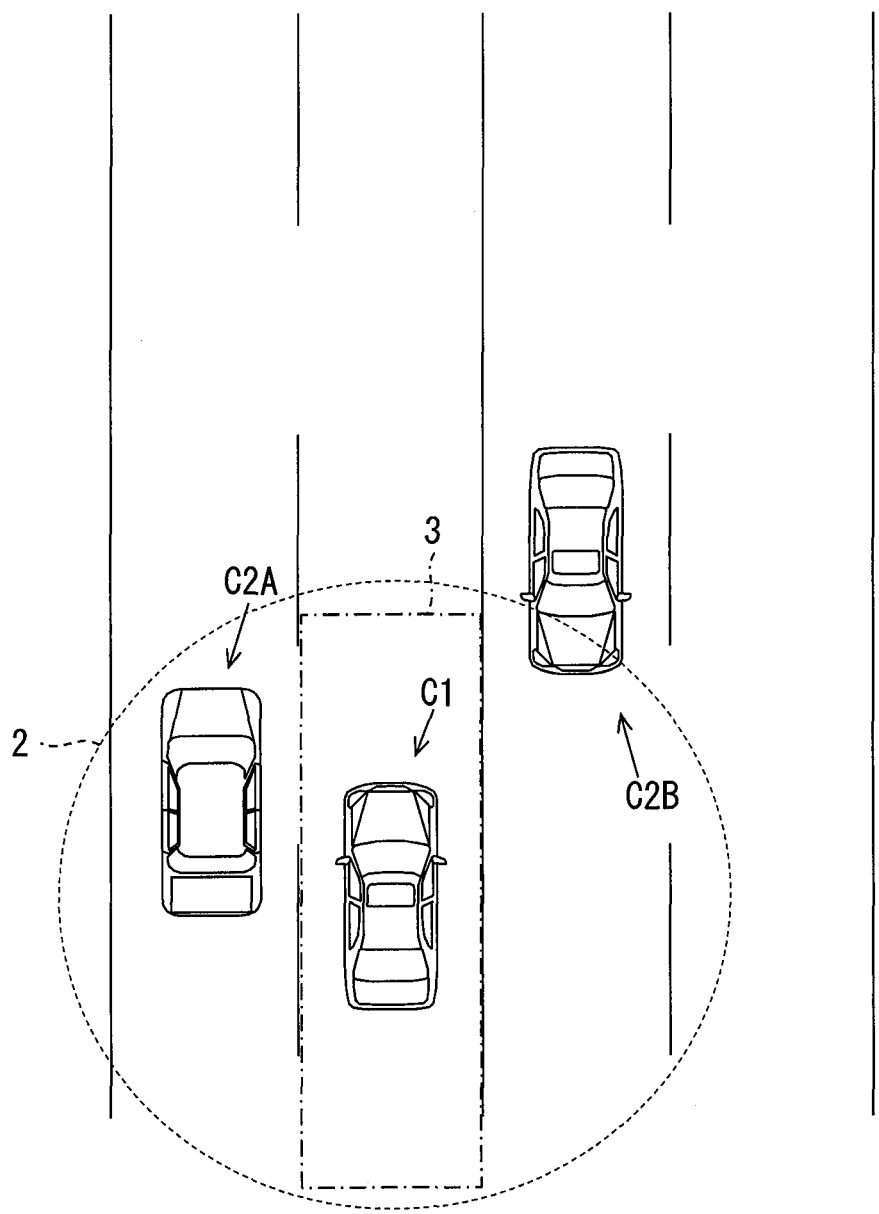
FIG. 1 is a diagram illustrating a travelling state of a vehicle which is equipped with a vehicle-mounted peripheral object notification system according to an embodiment of the present disclosure.
Figure 2:
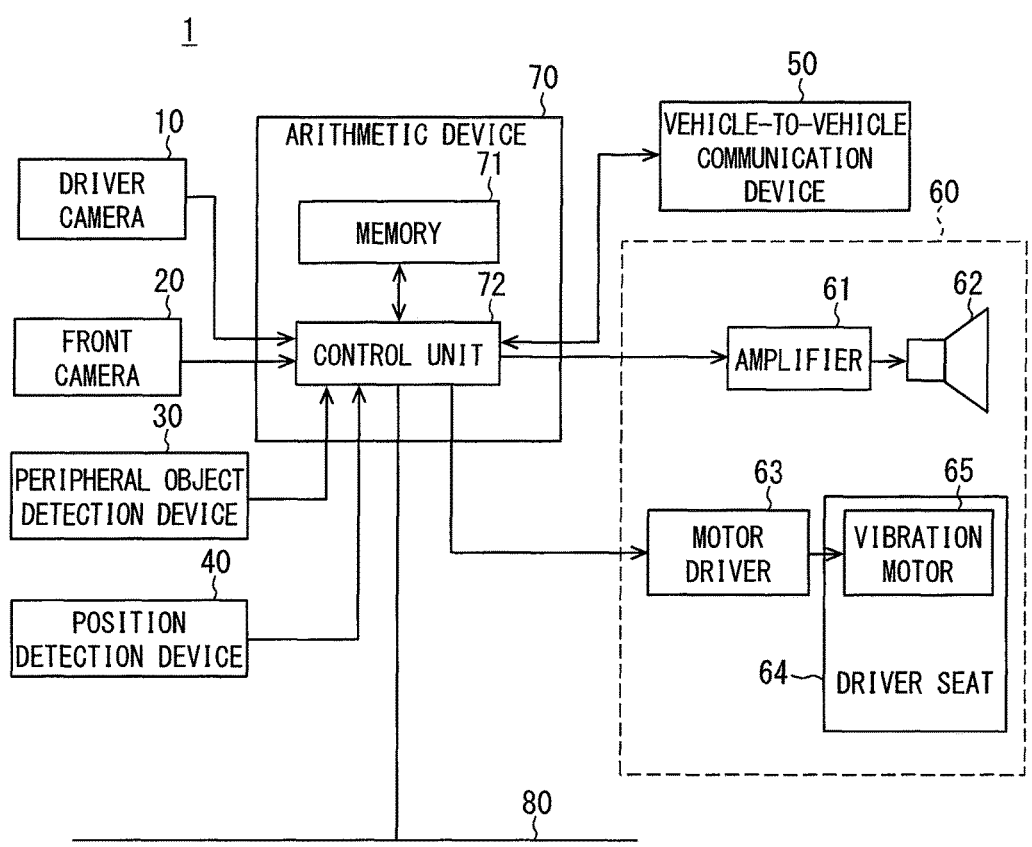
FIG. 2 is a block diagram illustrating a configuration of the vehicle-mounted peripheral object notification system.

Hereinafter, embodiments of the present disclosure will be described with reference to the drawings. FIG. 1 illustrates a state in which vehicles C1, C2A, and C2B are travelling. A vehicle-mounted peripheral object notification system 1 illustrated in FIG. 2 is mounted in each of those three vehicles C1, C2A, and C2B. In the following description, the vehicle C1 will be mainly described. The vehicle C1 corresponds to a first vehicle, and the vehicle-mounted peripheral object notification system 1 mounted in the vehicle C1 corresponds to a first vehicle-mounted peripheral object notification system. The vehicle C2A and the vehicle C2B correspond to second vehicles, and the vehicle-mounted peripheral object notification system 1 equipped to each of the vehicles C2A and C2B corresponds to a second vehicle-mounted peripheral object notification system. Further, an object notification system is configured by the vehicle-mounted peripheral object notification system 1 equipped to the vehicle C1 and the respective vehicle-mounted peripheral object notification systems 1 equipped to the vehicle C2A and the vehicle C2B.

The vehicle C2A is travelling in a lane adjacent to a travelling lane of the vehicle C1 in the same direction as a travelling direction of the vehicle C1, and the vehicle C2B is travelling in a lane opposite in the direction to each of the vehicles C1 and C2A.

(Configuration of Vehicle-Mounted Peripheral Object Notification System 1)

As illustrated in FIG. 2, the vehicle-mounted peripheral object notification system 1 includes a driver camera 10, a front camera 20, a peripheral object detection device 30, a position detection device 40, a vehicle-to-vehicle communication device 50, a notification device 60, and an arithmetic device 70.

In a vehicle interior, the driver camera 10 is attached to a position where a face of a driver who is seated on a driver's seat can be imaged, and h successively captures images including the driver's face.

The front camera 20 is disposed at a front end face of the vehicle or at a front end of the vehicle interior in order to detect a lane boundary line or the like, and takes images of a forward view of the subject vehicle.

The peripheral object detection device 30 detects an object existing in a periphery of the subject vehicle. In the present embodiment, for example, multiple infrared sensors are disposed at front and rear end faces, side faces, corner portions of the subject vehicle, and the multiple infrared sensors provide an object detection range 2 covering 360 degrees around the subject vehicle as illustrated in FIG. 1. The object detection range 2 exemplified in FIG. 1 is a range that is equal to or smaller than a detection limit distance, which is set to about several meters to 10 meters from the side surfaces, the front end face, and the rear end face of the subject vehicle.

The peripheral object detection device 30 detects a distance to each object existing in the object detection range 2 and a direction in which the object exists. The distance and the direction are detected based on an attachment position of a sensor such as an infrared sensor. Alternatively, the distance and the direction detected based on the attachment position of the sensor may be converted to a distance and a direction based on a predetermined position of the vehicle such as a center of the front portion, rear portion, right portion and left portion of the vehicle, or a driver's seat.

The position detection device 40 is a device that successively detects the current position of the subject vehicle, and includes, for example, a GNSS receiver used for a GNSS (Global Navigation Satellite System) for detecting the position of the subject device based on radio waves from a satellite. The position detection device 40 detects the current position based on signals received by the GNSS receiver.

The vehicle-to-vehicle communication device 50 is a device that performs a wireless communication with the vehicle-to-vehicle communication device 50 provided in another vehicle, and performs a wireless communication with the use of the radio waves of a predetermined frequency band such as a 5.8 GHz band or a 700 MHz band.

The notification device 60 includes an amplifier 61 and a speaker 62 as a configuration for performing an audio notification, and includes a motor driver 63 and multiple vibration motors 65 embedded in a driver's seat 64 as a configuration for performing notification by vibration. The multiple vibration motors 65 corresponding to the existing direction of the object detected by the peripheral object detection device 30 are selected and vibrated by the motor driver 63. It should be noted that the notification device 60 may include a part of the amplifier 61, the speaker 62, the motor driver 63, and the vibration motors 65. Alternatively, a display device may be provided in place of the amplifier 61, the speaker 62, the motor driver 63, and the vibration motors 65.

The arithmetic device 70 corresponds to a notification control apparatus, and includes a memory 71 and a control unit 72. The memory 71 is a writable memory, and successively stores a visual line direction of the driver. The control unit 72 is provided by a computer having a CPU, a ROM, a RAM, and so on, and the CPU executes a program stored in the ROM with the use of a temporary memory of the RAM so that the control unit 72 executes the process illustrated in FIG. 3. Incidentally, a part or all of functions to be executed by the control unit 72 may be configured by one or multiple ICs using a hardware configuration.

Signals representing images captured by the driver camera 10 and the front camera 20, signals detected by the peripheral object detection device 30, and signals detected by the position detection device 40 are input to the control unit 72. Further, the control unit 72 performs a transceiving of signals with the vehicle-to-vehicle communication device 50 as a communication partner.

Further, the control unit 72 outputs an electrical signal to the amplifier 61 for controlling the speaker 62 to generate a sound. The control unit 75 outputs an electrical signal to the motor driver 63 to specify one or more vibration motors 65 which are to be vibrated among the multiple vibration motors 65.

Further, the control unit 72 performs a transceiving of signals with various devices equipped to the subject vehicle as communication partners through an in-vehicle LAN 80. The signals acquired through the in-vehicle LAN 80 include a vehicle speed signal.

(Process Executed by Control Unit 72)

Figure 3:
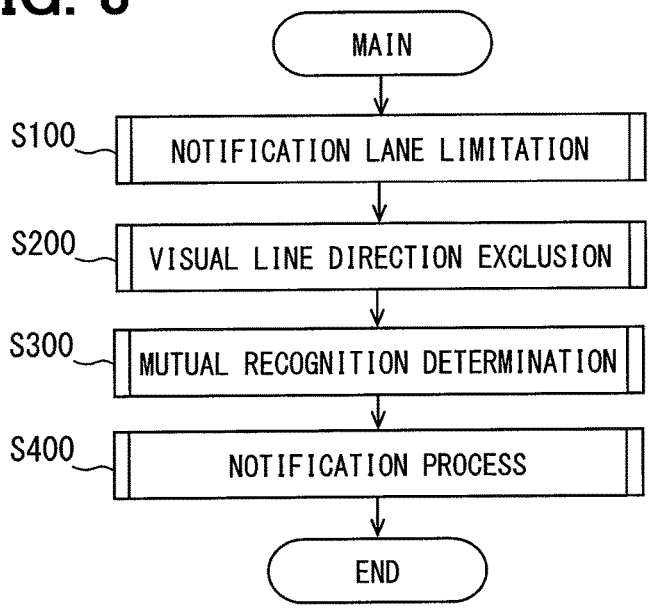
FIG. 3 is a flowchart illustrating a process executed by an arithmetic device shown in FIG. 2.

The control unit 72 periodically executes the process illustrated in FIG. 3 when a predetermined condition is satisfied. For example, when an ignition is turned on or the vehicle is travelling in forward direction, the predetermined condition is satisfied.

Figure 4:
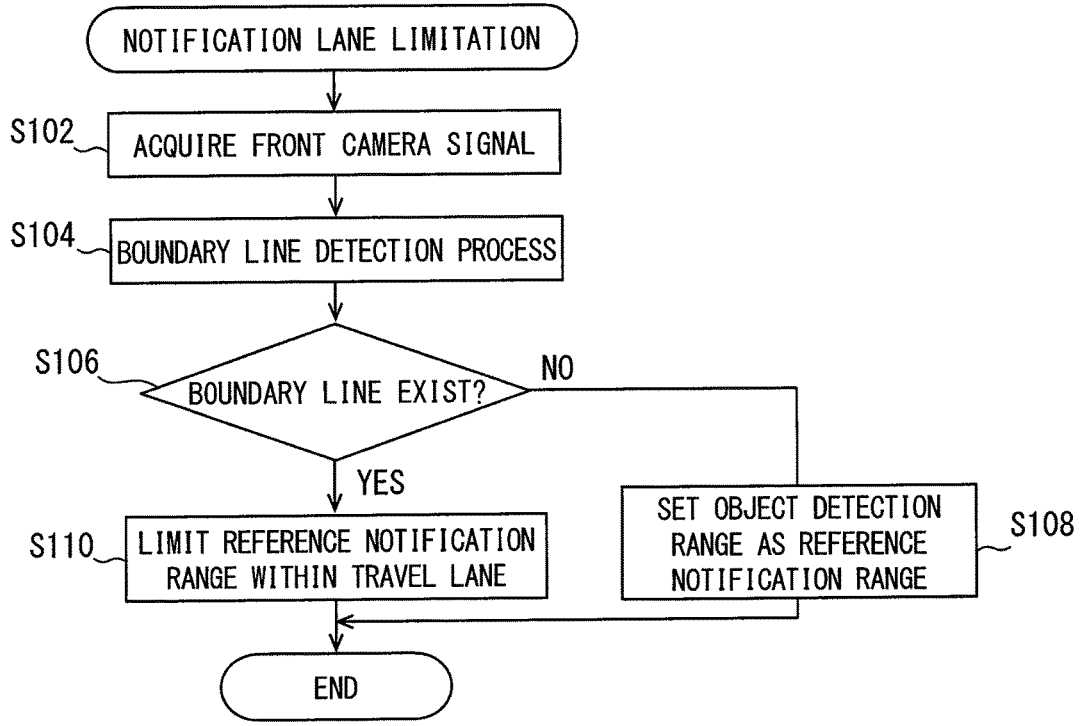
FIG. 4 is a flowchart illustrating a detailed process of step S100 shown in FIG. 3.

In step S100, a notification lane limiting process is performed. The process is a process of limiting the range for which the existence of the object is notified to the lane in which the subject vehicle is travelling, and in more detail, the process illustrated in FIG. 4 is executed as the notification lane limiting process. In FIG. 4, the control unit executes steps S102 and S104 to function as a boundary line detection unit, and executes steps S106 to S110 to function as a notification control unit.

In step S102, a front camera signal is acquired. In step S104, the position of the lane boundary line is detected by performing known boundary line detection process based on the front camera signal. In step S106, it is determined whether a lane boundary line indicating a boundary of the travelling lane of the subject vehicle has been detected, as a result of the process in step S104. When the determination in step S106 is negative, the process proceeds to step S108.

In step S108, the object detection range 2 of the peripheral object detection device 30 is used as the reference notification range. On the other hand, when the determination in step S106 is positive, the process proceeds to step S110.

In step S110, the reference notification range is limited to an intra-lane range 3 illustrated in FIG. 1. The intra-lane range 3 illustrated in FIG. 1 limits the object detection range 2 to a width of the travelling lane of the subject vehicle along a vehicle width direction, and limits the object detection range to a predetermined distance along a front-rear direction from a front end to a rear end of the subject vehicle. Herein, the predetermined distance along the front-rear direction does not exceed the objection detection range 2. In an example different from the one shown in FIG. 1, the boundaries of the object detection range 2 within the travelling lane may be used as the boundaries in the front-rear direction.

The description returns to FIG. 3. In step S200, a visual line direction excluding process is performed. The visual line direction excluding process is a process of excluding the recognition direction range determined based on the visual line of the driver from the reference notification range determined in step S100. The reference notification range determined in step S100 is the object detection range 2 or the intra-lane range 3.

Figure 5:
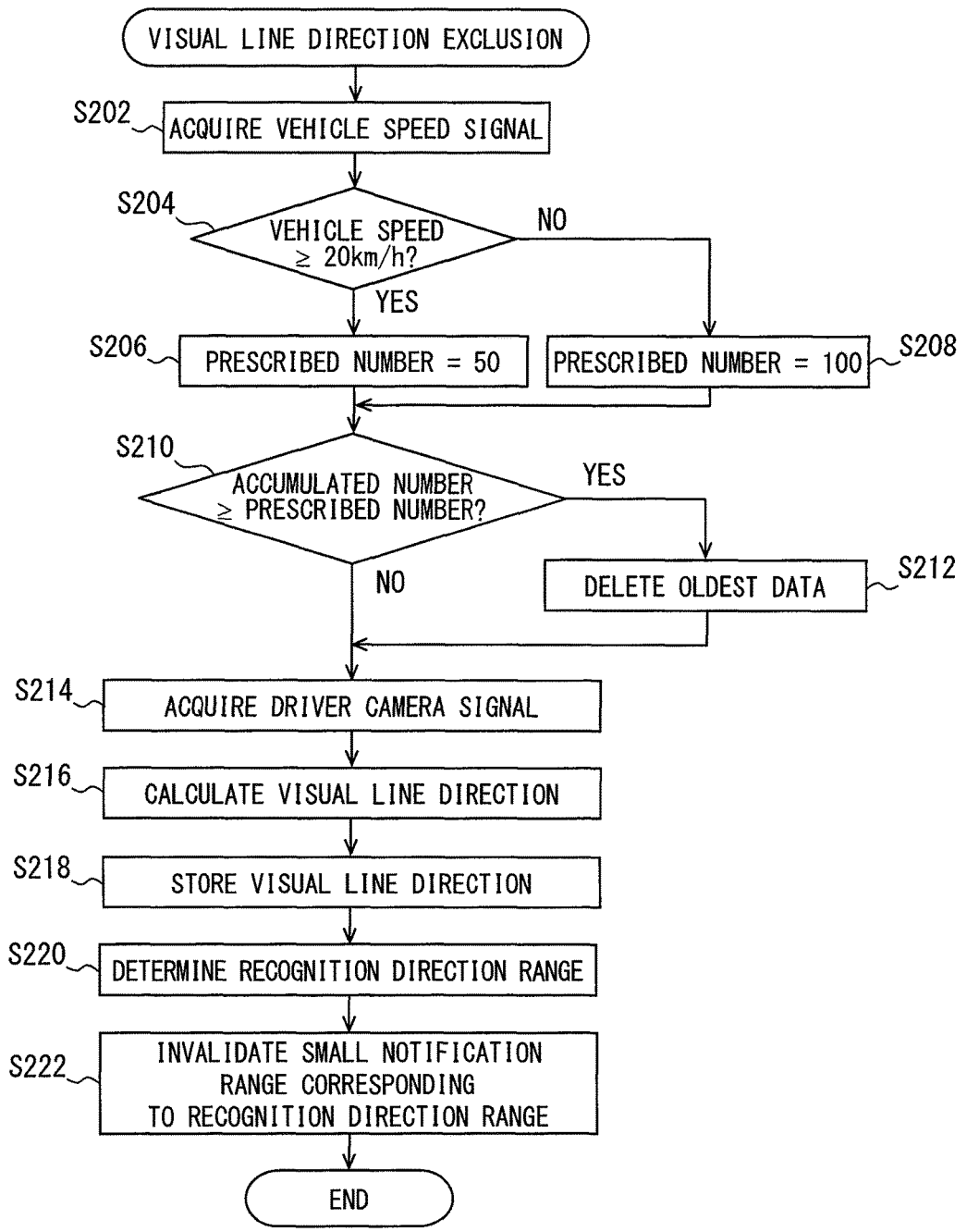
FIG. 5 is a flowchart illustrating a detailed process of step S200 shown in FIG. 3.

The visual line direction excluding process will be described in detail with reference to FIG. 5. In FIG. 5, the control unit executes steps S202 to S212, S220, and S222 to function as a notification control unit, and executes steps S214 to S218 to function as a visual line detection unit.

In step S202, the vehicle speed signal is acquired. In step S204, it is determined whether a vehicle speed determined according to the vehicle speed signal acquired in step S202 is 20 km/h or more or less than 20 km/h. When the vehicle speed is 20 km/h or more, the process proceeds to step S206 and a prescribed number indicating the accumulating number of the visual line directions is set to 50. When the vehicle speed is less than 20 km/h, the process proceeds to step S208, and the prescribed number is set to 100. It should be noted that 20 km/h, and 50 and 100 set as the prescribed number are an example. Those values may be adjusted appropriately based on experiments. Also, a calculation cycle of the visual line direction is set to a constant duration regardless of the value of prescribed number. The calculation cycle may be set to 10 times per second.

In step S210, it is determined whether the accumulating number of the visual line directions accumulated in the memory 71 is equal to or more than the prescribed number. When the determination result is positive, the process proceeds to step S212, and the oldest record of the visual line direction is deleted.

When the determination result in step S210 is negative, or after step S212 is executed, the process proceeds to step S214. In step S214, the driver camera signal is acquired.

In a subsequent step S216, the driver camera signal is analyzed through a known visual line detection process to calculate the visual line direction of the driver. Since the driver camera 10 is attached in the vehicle interior, the visual line direction calculated in this example indicates in which direction the visual line of the driver is directed relative to a predetermined direction of the subject vehicle, for example, the front-rear direction of the vehicle. A base point of the visual line direction is a driver's eye position.

In step S218, the visual line direction calculated in step S216 is additionally stored in the memory 71. With the execution of the step S218, the prescribed number of visual line directions set in step S206 or step S208 are stored in the memory 71 as the maximum.

Figure 6:
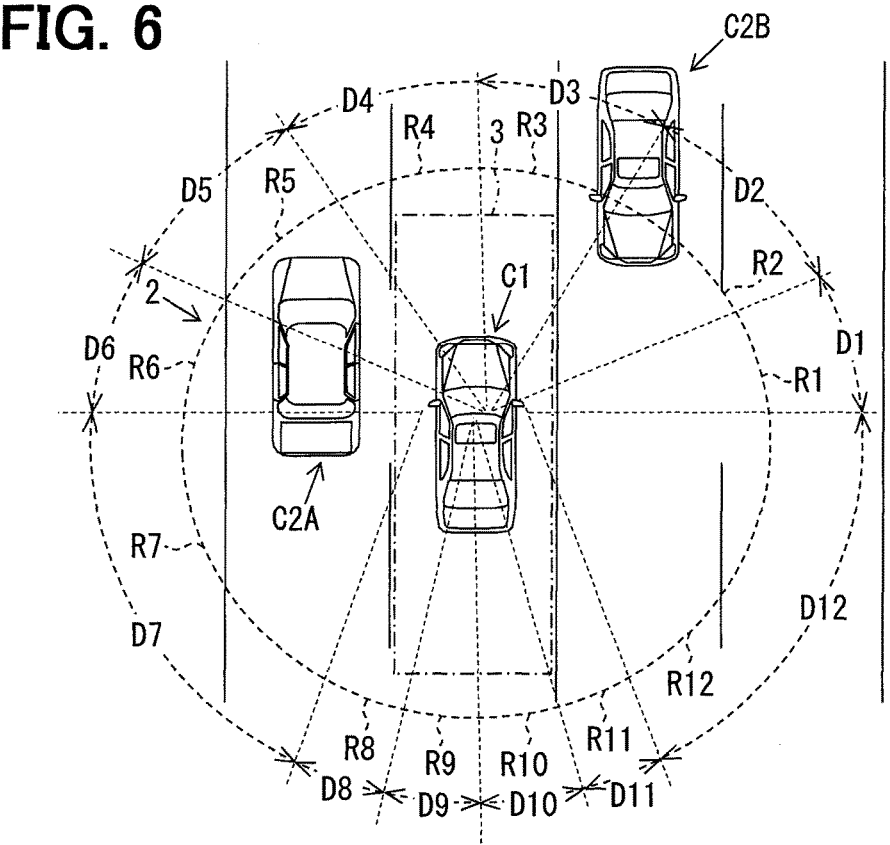
FIG. 6 is a diagram illustrating a candidate direction range that is a candidate of a recognition direction range, and a small notification range obtained by dividing a notification range.

In step S220, a recognition direction range is determined based on the visual line direction stored in the memory 71. Candidate direction ranges D1 to D12 illustrated in FIG. 6 are candidates of the recognition direction range determined in step S220. The candidate direction ranges D1 to D12 define the range of the direction, but the distance from the subject vehicle is not defined.

The candidate direction ranges D1 to D6 are ranges present in the front direction of the subject vehicle with respect to the driver, and are divided into adjacent candidate direction ranges D1 to D6 by boundary lines extending from the position of the driver's seat every 30 degrees.

The candidate direction ranges D7 to D12 are ranges present in the rear direction of the subject vehicle with respect to the driver. The candidate direction ranges D8 and D11 are angular ranges that can be visually recognized by the driver by side mirrors 91 and 92 (refer to FIG. 7), and the candidate direction ranges D9 and D10 are angular ranges obtained by dividing the angular range that can be visually recognized by an inner rearview mirror 90 (refer to FIG. 7) into two ranges including a right range and a left range. On the rear side of the driver, excepting the candidate direction ranges D8 to D11 that can be confirmed by the mirrors, the remaining ranges are defined as the candidate direction ranges D7 and D12. One of the candidate direction ranges D1 to D12, when the visual line direction stored in the memory 71 belongs to the one candidate direction range, this candidate direction range is set as the recognition direction ranges.

Figure 7:
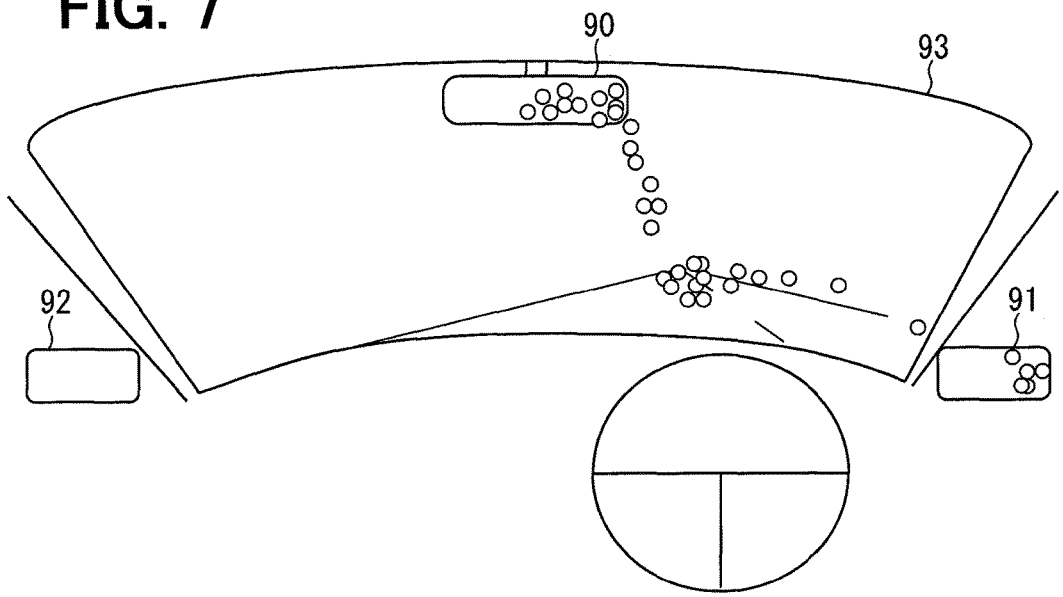
FIG. 7 is a diagram conceptually illustrating a visual line direction accumulated in a memory shown in FIG. 2.

FIG. 7 conceptually illustrates the visual line directions accumulated in the memory 71. In the example of FIG. 7, the visual line directions point a right half of the inner rearview mirror 90, the right side mirror 91, and an area of a front windshield 93 from a driver's seat front direction to a right end. In this case, the candidate direction ranges D2, D3, D10, and D11 are defined as the recognition direction ranges.

In step S222, a small notification range R corresponding to the recognition direction range determined in step S220 is invalidated. When the notification within the small notification range R is invalidated, a notification of an object present in the small notification range R is not performed to the driver.

As illustrated in FIG. 6, the small notification range R is a range generated by dividing the object detection range 2 or the intra-lane range 3 with reference to the candidate direction ranges D1 to D12. Therefore, in the example of FIG. 6, twelve small notification ranges R1 to R12 are set.

In step S220, when the candidate direction ranges D2, D3, D10, and D11 are set as the recognition direction ranges, the small notification ranges R2, R3, R10, and R11 are invalidated.

The description returns to FIG. 3. In step S300, a mutual recognition determination process is performed. The mutual recognition determination process is a process of determining whether the drivers driving the vehicles equipped with the vehicle-mounted peripheral object notification system 1 mutually recognize other vehicles.

Figure 8:
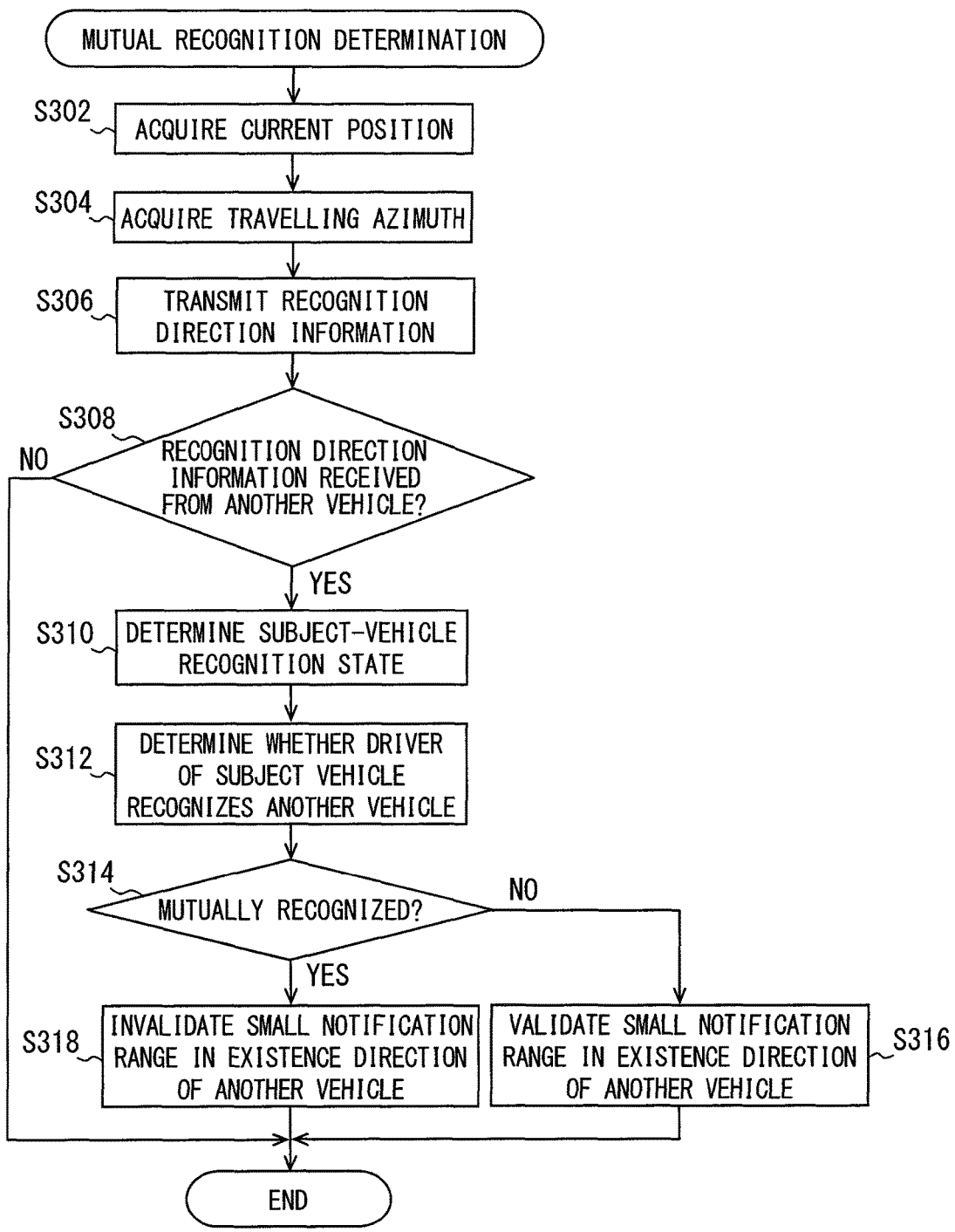
FIG. 8 is a flowchart illustrating a detailed process of step S300 shown in FIG. 3.

The mutual recognition determination process is illustrated in detail in FIG. 8. Referring to FIG. 8, the control unit executes steps S302 and S306 to function as a transmission control unit, executes step S304 to function as an azimuth acquisition unit, and executes steps S308 and S310 to function as a subject vehicle recognition state determination unit. The control unit executes steps S312 to S318 to function as a notification control unit.

In step S302, the current position is acquired from the position detection device 40. In step S304, the travelling azimuth of the subject vehicle is acquired. The travelling azimuth may be obtained from a gyro sensor with the use of the in-vehicle LAN 80. The travelling azimuth may also be determined from a travelling locus determined according to a change in the position of the subject vehicle.

In step S306, recognition direction information is transmitted from the vehicle-to-vehicle communication device 50 to the surrounding of the subject vehicle. A transmission method may be configured by a broadcast method which is performed to non-specified communication partners, or may be configured by a transmission method that specifies the communication partner.

The recognition direction information is information representing the recognition direction range of the driver with reference to a road. The recognition direction range determined in FIG. 5 represents the recognition direction range of the driver relative to the vehicle. Hereinafter, the recognition direction range determined in step S220 is defined as a vehicle reference recognition direction range, and the recognition direction range with reference to the road is set as a road reference recognition direction range. The road reference recognition direction range can be determined according to the vehicle reference recognition direction range, the current position of the vehicle, and the travelling azimuth of the vehicle. Therefore, in the present embodiment, information including the vehicle reference recognition direction range, and the current position and the travelling azimuth acquired in steps S302 and S304 is transmitted as the recognition direction information. The vehicle-mounted peripheral object notification system 1 equipped to each of the other vehicles C2A and C2B also transmits the recognition direction information.

In step S308, it is determined whether the recognition direction information has been received from the other vehicles such as the vehicles C2A and C2B. When the determination result is negative, the process of FIG. 8 is terminated, and when the determination result is positive, the process proceeds to step S310.

In step S310, the road reference recognition direction ranges of the other vehicles are determined according to the recognition direction information received from the other vehicles. Then, a subject vehicle recognition state indicating whether the drivers of the other vehicles recognized the subject vehicle is determined based on the determined road reference recognition direction ranges of the other vehicles and the current position of the subject vehicle.

In step S312, it is determined whether the driver of the subject vehicle recognizes the other vehicles, according to the current positions of the other vehicles and the recognition direction range determined in step S220.

In step S314, it is determined whether the drivers recognize the respective other vehicles mutually, based on whether the drivers of the other vehicles recognize the subject vehicle determined in step S310 and whether the driver of the subject vehicle recognizes the other vehicles determined in step S312.

When one of the driver of the subject vehicle or the driver of another vehicle fails to recognize the opponent vehicle, the determination of step S314 is negative. When the determination in step S314 is negative, the process proceeds to step S316. In step S316, the small notification range R in a direction along which another vehicle is present is validated.

When the determination in step S314 is positive, the process proceeds to step S318. In step S318, the small notification range R in the direction along which another vehicle is present is invalidated. The control unit executes steps S310 to S318 on each of the other vehicles from which the recognition direction information is received.

The description is returned to FIG. 3 again. In step S400, notification process is executed. The notification process is illustrated in detail in FIG. 9. The control unit executes the process shown in FIG. 9 to function as a notification control unit.

Figure 9:
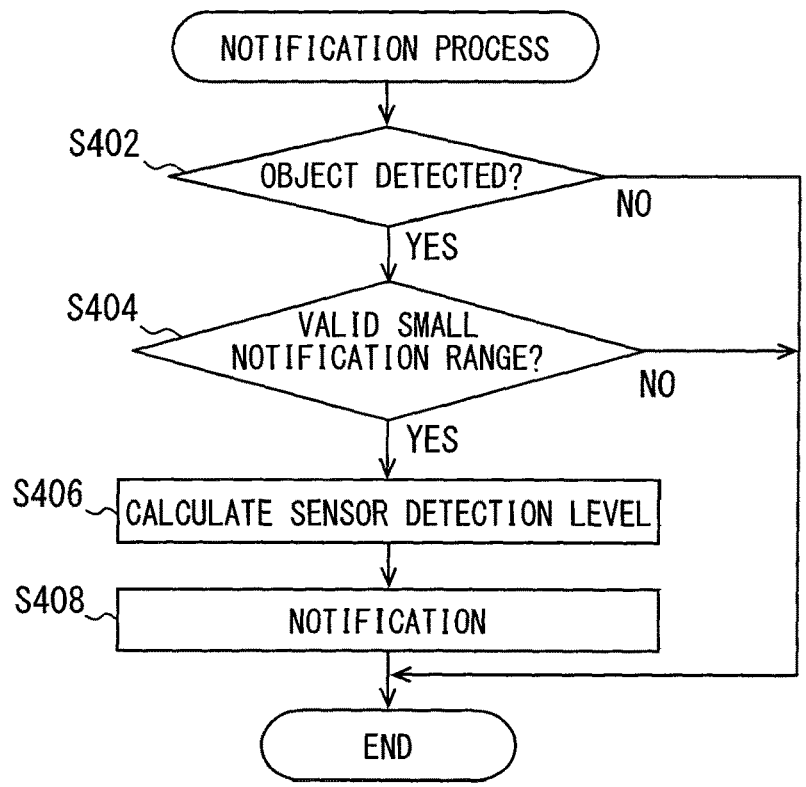
FIG. 9 is a flowchart illustrating a detailed process of step S400 shown in FIG. 3.

In step S402, it is determined whether the peripheral object detection device 30 has detected an object. When the determination is negative, the process of FIG. 9 is terminated. On the other hand, when the determination in step S402 is positive, the process proceeds to step S404.

In step S404, it is determined whether the direction in which the object is detected is a valid small notification range R. When the determination is negative, the process of FIG. 9 is terminated. On the other hand, when the determination in step S404 is positive, the process proceeds to step S406.

In step S406, a sensor detection level is calculated. The sensor detection level represents the distance to the object. In the subsequent step S408, the notification device 60 notifies the existence of the object in a notification mode corresponding to the sensor detection level calculated in step S406 and the direction in which the object is present. To give a specific example of the notification mode, in the notification by the motor driver 63 and the vibration motors 65, the vibration motor 65 determined according to the direction in which the object is present is vibrated with a vibration intensity according to the distance to the object.

Advantages of Embodiment

In the present embodiment described above, the visual line direction of the driver is successively calculated (S216), and the recognition direction range of the driver is determined according to the successively calculated visual line direction (S220). The recognition direction range is a range representing the direction in which the driver can be estimated to recognize the existence of the object. Therefore, the small notification range R corresponding to the recognition direction range is invalidated (S222). In other words, the notification range is set with the exclusion of the small notification range R corresponding to the recognition direction range. As a result, the existence of the object recognized in visual line direction of the driver can be prevented from being notified to the driver. Therefore, the existence of the object recognized by the driver can be restrained from being notified again, and troublesomeness caused by the notification about the recognized object can be reduced.

Furthermore, in the present embodiment, when the lane boundary line is detected (S106: YES), the reference notification range is limited to the intra-lane range 3. As a result, the vehicle C1 can be prevented from being notified of the existence of the vehicle C2A travelling in the lane adjacent to the travelling lane of the vehicle C1 in the same travelling direction, and the vehicle C1 can also be prevented from being notified of the existence of the vehicle C2B travelling in the lane opposite in the travelling direction to the vehicle C1. Therefore, notification indicating the existence of the vehicles C2A and C2B can be prevented while the vehicles are travelling in each lane without exceeding the lane boundary line.

When the vehicle C2A starts a lane change and the vehicle C2A enters the intra-lane range 3, the existence of the vehicle C2A is notified. In addition, even when the vehicle C2B crosses the lane boundary line and enters the intra-lane area 3, the presence of the vehicle C2B is notified. In addition, since there is no lane boundary line within an intersection, even in the case where the vehicles C1, C2A, and C2B are in a positional relationship illustrated in FIG. 1 within the intersection, the existence of the vehicles C2A and C2B are notified. Therefore, in the case where there is the lane boundary line, even when the reference notification range is limited to the intra-lane range 3, a situation that the notification is not performed in a status where the notification is required is suppressed.

Further, in the present embodiment, when the vehicle speed is relatively high, the prescribed number used for determining the recognition direction range is set to be smaller than that when the vehicle speed is relatively low (S204 to S208). As a result, when the vehicle speed is high, the number of visual line directions that can be calculated while travelling at a certain distance can be brought closer to the case where the vehicle speed is low, without shortening a calculation cycle of the visual line direction. Because there is no need to shorten the calculating cycle of the visual line direction, a processing load of the control unit 72 can be reduced.

Further, in the present embodiment, when the recognition direction information transmitted by the vehicles C2A and C2B is received (S308: YES), based on the subject vehicle recognition state by another driver and whether the driver of the subject vehicle has recognized another vehicle, it is determined whether the respective drivers mutually recognize the opponent vehicles (S314). When it is determined that any one of those drivers fails to recognize the opponent vehicle, the vehicle C1 validates the small notification range R in the direction in which another vehicle is present (S316). As a result, when the drivers of the vehicles C2A and C2B fail to recognize the vehicle C1, even though the driver of the vehicle C1 recognizes the opponent vehicle, the existence of the vehicles C2A and C2B is notified in the vehicle C1.

It is noted that a flowchart or the process of the flowchart in the present disclosure includes units (also referred to as steps), each of which is represented, for instance, as S100. Further, each unit can be divided into several sub-units while several units can be combined into a single unit. Furthermore, each of thus configured units can be also referred to as a circuit, device, module, or means.

Each or any combination of units explained in the above can be achieved as (i) a software unit in combination with a hardware unit (e.g., computer) or (ii) a hardware unit, including or not including a function of a related apparatus; furthermore, the hardware unit (e.g., integrated circuit, hardwired logic circuit) may be constructed inside of a microcomputer.

The embodiments of the present disclosure have been described above. However, the present disclosure is not limited to the above-described embodiments, and the following modifications also fall within the technical scope of the present disclosure. Further, the present disclosure can be implemented with various changes without departing from the spirit of the present disclosure, aside from the following modifications.

Modification 1

Figure 10:
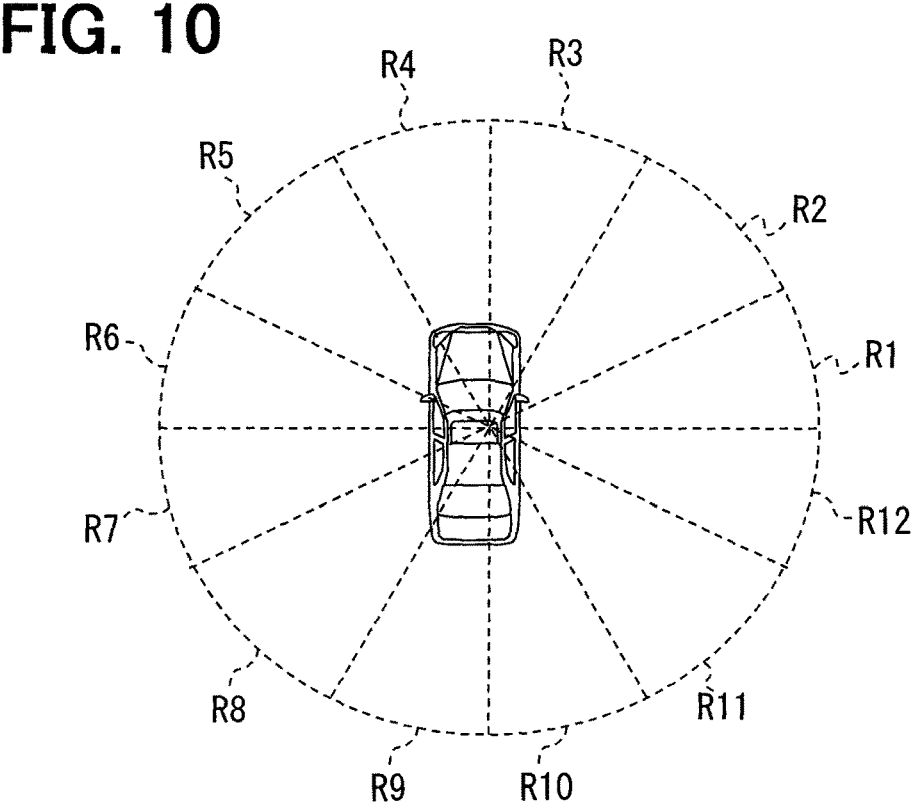
FIG. 10 is a diagram illustrating another example of the small notification range.

For example, in the above-described embodiment, the small notification ranges R in front of the subject vehicle are defined every 30 degrees. On the other hand, the small notification ranges R behind the subject vehicle are determined based on the ranges visible by the inner rearview mirror 90 and the side mirrors 91, 92, and therefore are not defined every 30 degrees. Alternatively, as illustrated in FIG. 10, all of the small notification ranges R1 to R12 may be defined every 30 degrees.

Modification 2

Further, the small notification range R and the recognition direction range may be variable according to the angular range of the object. In other words, an angular range in which the object recognized by the driver is present is defined as the recognition direction range, and a reference notification range other than the recognition direction range may be set as a valid notification range.

Modification 3

The peripheral object detection device 30 is not limited to the infrared sensor. Alternatively, various types of known devices that can detect the object, such as a sonar, a millimeter wave radar, a laser radar, and a camera, can be used.

Modification 4

The notification lane limiting process (S100) executed in the above embodiment can be omitted.

Modification 5

The mutual recognition determination process (S300) may be executed only when the reference notification range is not limited to the intra-lane range 3.

Modification 6

Further, even when the reference direction range is set to the intra-lane range 3, the reference direction range may be changed to the object detection range 2 when the subject vehicle detects a course direction change. The change in the course direction of the subject vehicle are determined on the basis of, for example, turning on of a right or left turn signal lamp and a change amount of a steering angle per unit time exceeding a certain amount.

Modification 7

In the above-described embodiment, the prescribed number that defines the accumulation number of visual line directions used for determining the recognition direction range is set to be different in two speed ranges of whether the vehicle speed is 20 km/h or more, or less than 20 km/h. The present disclosure is not limited to the above configuration. Alternatively, the prescribed number may be changed to three or more types of values corresponding to three or more speed ranges.

While the disclosure has been described with reference to preferred embodiments thereof, it is to be understood that the disclosure is not limited to the preferred embodiments and constructions. The disclosure is intended to cover various modification and equivalent arrangements. In addition, the various combinations and configurations, which are preferred, other combinations and configurations, including more, less or only a single element, are also within the spirit and scope of the disclosure.

What is claimed is:

1. A vehicle-mounted peripheral object notification system, comprising:
   a peripheral object detection device detecting an object existing in a periphery of a vehicle, wherein the periphery of the vehicle includes at least a rear area of the vehicle;
   a notification device notifying a driver of an existence of the object detected by the peripheral object detection device;
   a visual line detection processor successively detecting a visual line of the driver of the vehicle; and
   a notification control processor setting, as a notification range, a range obtained by excluding a recognition direction range, which is determined based on the visual line detected by the visual line detection processor, from a reference notification range, which is determined based on an object detection range of the peripheral object detection device, wherein the notification control processor controls the notification device to notify the object when the object detected by the peripheral object detection device exists in the notification range, wherein
   the rear area of the vehicle in which the object is detected includes an angular range that is visually recognizable by the driver with a side mirror, an angular range that is visually recognizable by the driver with an inner rearview mirror, and a remaining rear range that is visually unrecognizable by the driver with the side mirror or the rearview mirror.

2. The vehicle-mounted peripheral object notification system according to claim 1, further comprising:
   a boundary line detection processor detecting a position of a lane boundary line representing a boundary of a lane, wherein,
   when the boundary line detection processor detects a lane boundary line of a travelling lane of the vehicle, the notification control processor sets the reference notification range by limiting the object detection range of the peripheral object detection device within the travelling lane of the vehicle, and the travelling lane of the vehicle is defined by the lane boundary line detected by the boundary line detection processor.

3. The vehicle-mounted peripheral object notification system according to claim 1, wherein
   the notification control processor is configured to determine the recognition direction range using a prescribed number of latest visual lines successively detected by the visual line detection processor, and
   the prescribed number is set to have two or more values different from each other corresponding to a speed of the vehicle, and the two or more values of the prescribed number is set to be decreased with an increase of the speed of the vehicle.

4. An object notification system comprising:
   a first vehicle-mounted peripheral object notification system equipped to a first vehicle; and
   a second vehicle-mounted peripheral object notification system equipped to a second vehicle, wherein
   each of the first and second vehicle-mounted peripheral object notification system includes:

a peripheral object detection device detecting an object existing in a periphery of a vehicle, wherein the periphery of the vehicle includes at least a rear area of the vehicle;

a notification device notifying a driver of an existence of the object detected by the peripheral object detection device;

a visual line detection processor successively detecting a visual line of the driver of the vehicle; and a notification control processor setting, as a notification range, a range obtained by excluding a recognition direction range, which is determined based on the visual line detected by the visual line detection processor, from a reference notification range, which is determined based on an object detection range of the peripheral object detection device, wherein the notification control processor controls the notification device to notify the object when the object detected by the peripheral object detection device exists in the notification range, the second vehicle-mounted peripheral object notification system further includes:

a vehicle-to-vehicle communication device performing a transceiving of a signal in a wireless manner with a different vehicle;

a position detection device detecting a current position;

an azimuth acquisition processor acquiring a travelling azimuth of the second vehicle; and a transmission control processor controlling the vehicle-to-vehicle communication device to transmit the current position detected by the position detection device, the travelling azimuth acquired by the azimuth acquisition processor, and one of the visual line detected by the visual line detection processor or recognition direction information, wherein the recognition direction information indicates the recognition direction range of the driver of the second vehicle and is determined based on the current position, the travelling azimuth, and the visual line, the first vehicle-mounted peripheral object notification system further includes:

the vehicle-to-vehicle communication device;

the position detection device; and a subject vehicle recognition state determination processor determining whether the driver of the second vehicle recognizes the first vehicle based on the recognition direction range of the driver of the second vehicle and the current position of the first vehicle which is detected by the position detection device when the vehicle-to-vehicle communication device receives the recognition direction information, wherein the recognition direction range of the driver of the second vehicle is determined based on the recognition direction information that is received, and the notification control processor determines whether to control the notification device to notify an existence of the second vehicle based on a determination result indicating whether the second vehicle is present in the recognition direction range and a determination result indicating whether the driver of the second vehicle recognizes the first vehicle, and the determination result indicating whether the driver of the second vehicle recognizes the first vehicle is obtained by the subject-vehicle recognition state determination processor.

5. The object notification system according to claim 4, wherein the notification control processor notifies the existence of the second vehicle when the subject vehicle recognition state determination processor determines that the driver of the second vehicle fails to recognize the first vehicle and the second vehicle is present within the recognition direction range.

6. The object notification system according to claim 4, wherein the notification control processor cancels a notification of the existence of the second vehicle when the second vehicle is present within the recognition direction range and the subject vehicle recognition state determination processor determines that the first vehicle is recognized by the driver of the second vehicle.

7. A notification control apparatus employed in a vehicle-mounted peripheral object notification system, wherein the vehicle-mounted peripheral object notification system includes a peripheral object detection device that detects an object existing in a periphery of a vehicle and a notification device that notifies a driver of an existence of the object detected by the peripheral object detection device, and the periphery of the vehicle includes at least a rear area of the vehicle, the notification control apparatus comprising:

a visual line detection processor successively detecting a visual line of the driver of the vehicle; and a notification control processor setting, as a notification range, a range obtained by excluding a recognition direction range, which is determined based on the visual line detected by the visual line detection processor, from a reference notification range, which is determined based on an object detection range of the peripheral object detection device, wherein the notification control processor controls the notification device to notify the object when the object detected by the peripheral object detection device exists in the notification range, wherein the rear area of the vehicle in which the object is detected includes an angular range that is visually recognizable by the driver with a side mirror, an angular range that is visually recognizable by the driver with an inner rearview mirror, and a remaining rear range that is visually unrecognizable by the driver with the side mirror or the rearview mirror.

8. The vehicle-mounted peripheral object notification system according to claim 1, wherein the notification control processor keeps the notification device from notification based on the recognition direction range determined based on the visual line.

* * * * *